US008453686B2

(12) United States Patent
Klaus et al.

(10) Patent No.: US 8,453,686 B2
(45) Date of Patent: Jun. 4, 2013

(54) METHOD AND APPARATUS FOR FILLING TUBES IN A TUBE-FILLING MACHINE

(75) Inventors: Horst Klaus, Stutensee (DE); Matthias Kirsten, Eggenstein-Leopoldshafen (DE)

(73) Assignee: IWK Verpackungstechnik GmbH, Stutensee (DE)

( * ) Notice: Subject to any disclaimer, the term of this patent is extended or adjusted under 35 U.S.C. 154(b) by 596 days.

(21) Appl. No.: 12/733,298

(22) PCT Filed: Sep. 3, 2008

(86) PCT No.: PCT/EP2008/007181
§ 371 (c)(1),
(2), (4) Date: Feb. 23, 2010

(87) PCT Pub. No.: WO2009/033595
PCT Pub. Date: Mar. 19, 2009

(65) Prior Publication Data
US 2010/0175776 A1 Jul. 15, 2010

(30) Foreign Application Priority Data

Sep. 6, 2007 (DE) .......................... 10 2007 042 433

(51) Int. Cl.
*B65B 1/30* (2006.01)
(52) U.S. Cl.
USPC .............................. 141/83; 141/139; 141/196
(58) Field of Classification Search
USPC .................. 141/2, 83, 114, 130, 139, 196
See application file for complete search history.

(56) References Cited

U.S. PATENT DOCUMENTS

| 1,828,865 | A | * | 10/1931 | Hopkins | 141/9 |
|---|---|---|---|---|---|
| 2,103,817 | A | * | 12/1937 | Johnson | 141/116 |
| 3,648,741 | A | | 3/1972 | Croasdale | |
| 4,344,493 | A | * | 8/1982 | Salmonsen et al. | 177/52 |
| 4,407,379 | A | * | 10/1983 | Pryor et al. | 177/52 |
| 4,662,409 | A | * | 5/1987 | Egli | 141/1 |
| 4,676,282 | A | | 6/1987 | Bellini | |
| 5,156,193 | A | * | 10/1992 | Baruffato et al. | 141/1 |
| 5,285,825 | A | | 2/1994 | Townsley | |
| 5,515,888 | A | * | 5/1996 | Graffin | 141/1 |
| 5,623,976 | A | * | 4/1997 | Muscara | 141/83 |
| 6,334,471 | B1 | * | 1/2002 | Graffin | 141/83 |
| 6,800,818 | B2 | * | 10/2004 | Balboni et al. | 177/52 |
| 6,857,453 | B2 | * | 2/2005 | Nishino et al. | 141/83 |
| 8,028,723 | B2 | * | 10/2011 | Blochlinger | 141/5 |

FOREIGN PATENT DOCUMENTS

| CH | 3 96 743 | 1/1966 |
|---|---|---|
| DE | 1 275 438 | 8/1968 |
| DE | 39 38 220 | 5/1991 |

(Continued)

*Primary Examiner* — Timothy L Maust
(74) *Attorney, Agent, or Firm* — Paul Vincent

(57) ABSTRACT

Tubes are directed to a filling station (15) for filling the tubes (T) in a tube-filling machine, and, in the filling station, a liquid or highly viscous product (P) is poured into the tubes by means of a filling apparatus (16). Each tube is also weighed and the actual weight is compared with a desired weight. The filling apparatus is adjusted if the variance between the actual weight and the desired weight lies outside predetermined limits. In the process, the weighing of the tubes in the tube-filling machine occurs within 5 sec. after the end of the filling operation, either already in the filling station or between the filling station and an ejection station (22) for bad tubes (T').

13 Claims, 1 Drawing Sheet

FOREIGN PATENT DOCUMENTS

| | | |
|---|---|---|
| DE | 199 25 039 | 12/2000 |
| DE | 10 2005 014 116 | 9/2006 |
| GB | 1 012 072 | 10/1964 |
| GB | 2 017 971 | 10/1979 |
| WO | 90/15755 | 12/1990 |

* cited by examiner

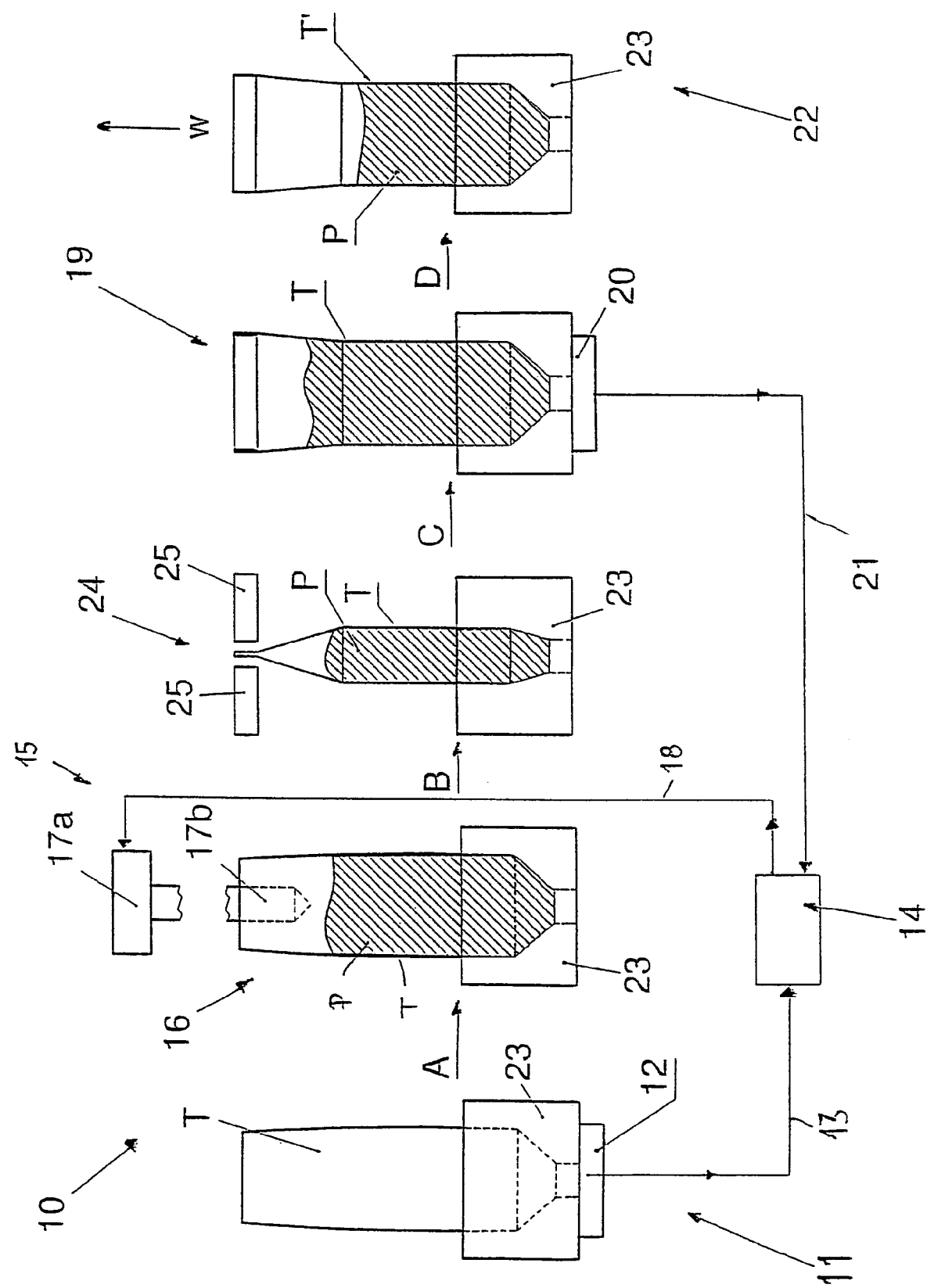

METHOD AND APPARATUS FOR FILLING TUBES IN A TUBE-FILLING MACHINE

This application is the national stage of PCT/EP2008/007181 filed on Sep. 3, 2008 and also claims Paris Convention priority of DE 10 2007 042 433.9 filed Sep. 6, 2007.

BACKGROUND OF THE INVENTION

The invention concerns a method for filling tubes in a tube-filling machine, wherein the tubes are directed to a filling station of the tube-filling machine, and, in the filling station, a liquid or highly viscous product is poured into the tubes by means of a filling apparatus, wherein, after being filled, each tube is weighed and the actual weight is compared with a desired weight, the filling apparatus being adjusted if the variance between the actual weight and the desired weight lies outside predetermined limits.

The invention also relates to an apparatus for filling tubes in a tube-filling machine, with a filling station, in which a liquid or a highly viscous product can be poured into the tubes by means of a filling apparatus.

A tube-filling machine of the conventional type has an endlessly circulating conveying apparatus that comprises multiple holders, into each of which a tube holder is inserted. Each tube holder can accommodate one tube with its head or cap section, wherein each tube together with the tube holder passes through the individual workstations of the tube-filling machine. In a filling station, a product, usually a liquid or highly viscous product, is poured into the tube, which is open at the top, whereupon the tube is sealed, for example, welded, at its upper end in a downstream sealing station and subsequently removed from the tube-filling machine.

The quantity of the product to be poured in is usually dosed volumetrically, i.e. the volume of the product to be poured in is suctioned from a supply container by means of a dosing piston and subsequently pressed into the tube. The filling volume is consequently defined by the diameter of the dosing piston and its travel. However, in practice, it has been shown that this volumetric dosing has disadvantages. In particular, air pockets can become trapped in the filling volume which results in too small a quantity of the product being poured into the tube. Furthermore, the filling volume is subject to fluctuations due to ambient conditions and the composition of the product.

The filling plant of the product or the producer of the filled tubes must guarantee to the customer that the product in the tube complies with a minimum weight. For that reason the weight of the filled tubes is inspected. Once the tubes have been sealed at the upper or lower end and have been removed from the tube-filling machine at the removal station, they move across a weigh-belt on which the weight of each tube is determined. Those tubes that do not comply with a predetermined desired weight are rejected as "bad tubes" and cannot be reused. To keep the proportion of "bad tubes" as low as possible, a known method is to fill the tubes with a volume of the product that is above the desired volume. The disadvantage of this method, however, is that a disproportionally large quantity of the product is poured into the tube, which is uneconomical. Once a sufficiently large number, usually 100, tubes have been weighed, an average value is calculated from the measured values and used as the basis for adjusting the dosing cylinder of the filling station. A disadvantage of this method is that a relatively large number of tubes may have been filled before adjustment of the filling station is corrected. This results in a relatively large number of tubes being imprecisely filled, which then have to be removed from the subsequent production process.

GB 1,012,072 discloses that the process of filling the tube can be controlled by the weight. The tube is positioned on a weighing apparatus during filling and the product is poured into the tube until the desired weight is ascertained by the weighing apparatus, whereupon feeding of the product into the tube is interrupted. However, this method takes a relatively long time to fill the tube with great precision, i.e. filling is relatively slow, which reduces the efficiency of the tube-filling machine.

The object of the invention is to provide a method for filling the tubes in a tube-filling machine, with which the tubes can be filled quickly and with high precision. Moreover, an apparatus for filling tubes in a tube-filling machine is to be provided with which the method can be performed in a simple manner.

SUMMARY OF THE INVENTION

With respect to the method, the object is achieved with the features of the independent claim. Therein it is intended that, after being filled, each tube is already weighed in the tube-filling machine, in the filling station or between the filling station and an ejection station for bad tubes, and within a relatively short duration of max. 5 secs. after being filled, and that the actual weight is compared with a desired weight. If the variance between the actual weight and the desired weight lies outside predetermined limits, the filling apparatus is controlled and adjusted so that the actual value for the subsequent tubes is closer to the desired weight.

The invention is based on the concept that the weight of the filled tube must already be inspected and monitored in the tube-filling machine, but only downstream of the filling station. If the ascertained actual weight lies within predetermined limits of, for example, ±1% relative to the desired weight, the tube is filled correctly, so that it is not necessary to adjust the filling apparatus. It is therefore preferable if the setting of the filling apparatus remains unchanged if the variance between the actual weight and the desired weight remains within the predetermined limits. The limit values for the acceptable variance between the actual weight and the desired weight can preferably be altered by the operator of the tube-filling machine and adjusted such that the tube-filling machine can be adapted both to the type and to the filling volume of the product to be poured into the tubes.

The tubes are weighed within a relatively short time of maximum 5 secs., preferably 3 secs., and especially preferably already within 2 secs. after the end of the filling operation. Weighing the tubes shortly after the filling operation results in a direct control loop. Ideally, a tube is weighed in or directly after the filling station, then a correction value is determined that is input directly to the filling unit so that the latter can be adjusted as soon as the next tube is filled. However, it is hardly possible to achieve this in actual use because weighing a tube and filling the next tube are performed largely simultaneously.

For that reason, the correction value cannot be applied until the tube after the next.

In one possible embodiment of the invention, each time the actual weight of a tube deviates from the desired weight, a corresponding correction value is calculated and the filling apparatus is adjusted accordingly. To prevent the filling apparatus from being subjected to a high level of wear from the adjustment movements, in a further embodiment of the invention, an average correction value is derived from the weight of the n sequential tubes, which is taken as the basis for adjusting the filling apparatus if a variance between the actual weight and the desired weight outside the predetermined limits is ascertained. In this embodiment, the number n of sequential tubes whose weight provides the basis for calculating the average correction value is preferably 2 to 10, and, in particular, 2 to 5.

According to this invention, the tubes are weighed in the tube-filling machine prior to an ejection station for bad tubes. Those tubes whose weight is below the prescribed lower limit value are detected as bad tubes and removed from the subsequent packaging process.

The filling station is usually located downstream of a sealing station in which the tubes are sealed. Preferably, the tubes are weighed downstream of the sealing station, i.e. those tubes that have already been sealed are weighed.

In one possible embodiment of the invention, the actual weight, which is compared with the predetermined desired weight, can be the weight of the filled tube, i.e. the weight of the product poured into the tube and the weight of the tube (tare). Usually, the tube is located in a tube holder when it passes through the individual work stations of the tube-filling machine. In one possible embodiment, the filled tube can be weighed together with the tube holder holding it. Here, the weight of the tube holder can be stored in a database in the machine and subtracted from the determined actual weight, which thus produces the weight of the filled tube. To determine the weight of the individual tubes, the weight of each tube holder can be ascertained when the tube-filling machine commences operation, wherein the individual weight values are stored so that they can be uniquely assigned to the corresponding tube holders.

Alternatively, it is also possible to lift the filled tube out of the tube holder for the weighing operation in order to determine the weight of the filled tube only. Subsequently, the tube is reinserted in the tube holder.

It has been shown in practice that the weight of the empty tubes is also subject to relatively large fluctuations, especially if the empty tubes are supplied by different manufacturers. To increase the precision of the filling operation, a further embodiment of the inventive process can involve comparing not the actual weight of the filled tube, but the actual weight of the product poured into the tube with a desired weight. Towards this end, the weight of the filled tube, i.e. the weight of the product and tube, is first determined by the stated method. In addition, the weight of the empty tube is ascertained before the filling operation and subtracted from the weight of the filled tube that is ascertained thereafter. This results in the weight of the filled product, which is the actual weight for the above mentioned comparison with a prescribed desired weight.

With respect to the apparatus, the object stated above is achieved by providing a weighing station for determining the weight of the filled tube that is disposed within the tube-filling machine, either in or downstream of the filling station, and a control apparatus that receives a weight signal from the weighing station, which, after evaluation of the weight signal, controls the filling apparatus. An empty tube weighing machine can be disposed upstream of the filling station, which sends an empty tube weight signal to the control apparatus so that the control apparatus can ascertain the weight of the quantity of product actually filled from the weight of the filled tube and the weight of the empty tube.

Preferably, an ejection station for bad tubes is provided downstream of the weighing station and, in particular, also downstream of the sealing station.

The described method and apparatus are especially advantageous when the tubes are filled with a hitherto unknown product or with a hitherto unused filling weight. The desired filling weight can be achieved without manually setting the travel of the filling or dosing apparatus. Instead, the filling or dosing apparatus adapts itself in a few iterative steps to the desired filling weight by weighing each tube after it has been filled and, to achieve the desired weight, the filling or dosing apparatus is adjusted until the tubes have reached the required filling weight.

Further details and characteristics of this invention are provided by the following description of an embodiment with reference to the drawing.

BRIEF DESCRIPTION OF THE DRAWING

The sole FIGURE provided shows a schematic representation of tubes as they pass through the individual work stations of a tube-filling machine.

DESCRIPTION OF THE PREFERRED EMBODIMENT

The FIGURE shows individual work stations of a tube-filling machine 10 that are passed through one by one by a tube T, which is held in a tube holder 23 by its lower head or cap section. Further work stations of the tube-filling machine are omitted for reasons of clarity.

The empty tube T is weighed together with its tube holder 23 in an empty tube weighing station 11 by means of an empty tube weighing apparatus 12. The empty tube weighing apparatus 12 outputs to a control apparatus 14 an empty tube weight signal via a lead 13, which, in the depicted case, comprises the weight of the empty tube T and the weight of its tube holder 23.

Alternatively, it is also possible, however, to remove the empty tube T from its tube holder 23 in order to weigh it, so that only the weight of the empty tube is transmitted to the control apparatus 14.

After it has been weighed, the empty tube T is directed to a filling station 15, as indicated by arrow 16. The filling station 15 comprises a filling apparatus 16 with a filling nozzle 17b, which is inserted into tube T, and a dosing apparatus 17a, with which a quantity of the product P to be poured into tube T can be set. The control apparatus 14 can influence the dosing apparatus 17a via a lead 18 and adjust it in such a way that the quantity of the product P that is poured into the tube T during one filling operation can be altered while the tube-filling machine is in operation.

After the filling operation, the tube T that is held in tube holder 23 and that is now filled with product P but whose upper end is still open, is directed to a sealing station 24, as indicated by arrow B. The upper, open end of tube T is sealed in the sealing station 24. In the depicted example, the tube T is made of plastic and the sealing station 24 comprises two welding jaws 25, which press together the upper end of tube T by applying heat energy, so that a welded joint is formed that is essentially transverse with respect to the longitudinal axis of tube T and that seals the latter.

After tube T has been sealed, it is directed together with its tube holder 23 to a weighing station 19, which is indicated by arrow C. In weighing station 19, the weight of the filled tube T together with its tube holder 23 is determined by means of a weighing apparatus 20. The weighing apparatus 20 passes a corresponding weight signal to the control apparatus 14 via a lead 21. From the signal from the weighing apparatus 20 that indicates the weight of the filled tube including its tube holder 23, and, from the signal of the empty tube weighing apparatus 12 that indicates the weight of the empty tube T and of the tube holder 23, the weight of the product P that is poured into the tube can be determined by subtraction. This actual weight of the filled product is compared with a desired weight. If the variance between the actual weight and the desired weight is only relatively slight and lies within predetermined limits, the tube T is classified as properly filled and the control apparatus 14 does not adjust the dosing apparatus 17a of the filling apparatus 16.

If the comparison between the actual weight and the desired weight results in an excessive variance, the tube is classified as a bad tube and the weight values of the next 2 to 10 and preferably of the next 2 to 5 tubes are checked and an average variance calculated from the given variances. The control apparatus 14 conveys a corresponding correction value to the dosing apparatus 17a and adjusts it accordingly.

Instead of weighing the filled tube T in the weighing station 19 together with tube holder 23, it is also possible to remove the tube T from the tube holder 23 for the weighing action. If the tube T is weighed both in the empty tube weighing station 11 and in the weighing station 19, in each case, without the tube holder 23, the weight of the product P poured into the tube can be ascertained according to the method stated above by subtracting one of the two weight signals from the other.

It is also possible to determine the weight of every tube holder 23 of the tube-filling machine before the filling operation starts by means of a so-called teach-in procedure and to store them in a relevant database so that the weight of each individual tube holder can be calculated from a corresponding weight signal as needed.

After the weighing action in the weighing station 19, the filled tube T is directed to a downstream ejection station 22, as is indicated by arrow D. In ejection station 22, bad tubes T that are inadequately filled are removed from the subsequent process, as indicated by arrow W.

We claim:

1. A method for filling tubes in a tube-filling machine, the method comprising the steps of:
   a) directing the tubes to a filling station of the tube-filling machine;
   b) introducing, in the filling station, a liquid or highly viscous product into the tubes by means of a filling apparatus;
   c) weighing, following step b), each tube after being filled;
   d) comparing an actual weight with a desired weight;
   e) adjusting the filling apparatus if a variance between the actual weight and the desired weight lies outside predetermined limits; and
   f) ejecting bad tubes in an ejection station, wherein weighing of the tubes in the tube-filling machine, in the filling station or between the filling station and the ejection station, occurs no later than 5 seconds after completion of step b).

2. The method of claim 1, wherein weighing of the tubes occurs no later than 3 sec. after an end of a filling operation.

3. The method of claim 1, wherein weighing of the tubes occurs no later than 2 sec. after an end of a filling operation.

4. The method of claim 1, wherein a setting of the filling apparatus remains unchanged if the variance between the actual weight and the desired weight lies within predetermined limits.

5. The method of claim 1, wherein, if the variance between the actual weight and the desired weight lies outside predetermined limits, an average correction value is determined from a weight of n subsequent tubes, on a basis of which the filling apparatus is adjusted.

6. The method of claim 5, wherein n=2 to 10.

7. The method of claim 6, wherein n=2 to 5.

8. The method of claim 1, wherein a filled tube is located in a tube holder and is weighed together therewith, a weight of the tube holder being stored and subtracted from a derived weight.

9. The method of claim 1, wherein a filled tube is located in a tube holder and is lifted out of the tube holder for a weighing process.

10. The method of claim 1, wherein a weight of an empty tube is determined before a filling operation and is subtracted from a subsequently determined weight of a filled tube.

11. An apparatus for filling tubes in a tube-filling machine, the apparatus comprising:
   a filling station, said filling station having a mechanism for introducing the tubes thereto;
   a filling apparatus disposed in said filling station, said filling apparatus structured to introduce a liquid or highly viscous product into the tubes;
   one single filled-tube weighing mechanism, said filled-tube weighing mechanism disposed downstream of said filling apparatus to weigh each tube after filling thereof, wherein no transverse displacement of filled-tubes is required prior to weighing thereof;
   means for comparing an actual weight to a desired weight;
   a filling apparatus adjustment mechanism, said adjustment mechanism structured to adjust said filling apparatus if a variance between the actual weight and the desired weight lies outside predetermined limits; and
   an ejection station disposed downstream of said filling apparatus and said filled-tube weighing mechanism for ejecting bad tubes, wherein weighing of the tubes in the tube-filling machine, in said filling station or between said filling station and said ejection station occurs no later than 5 seconds after filling of the tubes.

12. The apparatus of claim 11, wherein said filled-tube weighing mechanism is disposed inside the tube-filling machine, said comparing means comprising a control apparatus that receives a weight signal from said filled-tube weighing mechanism and controls said filling apparatus after having evaluated said weight signal.

13. The apparatus of claim 12, wherein an empty tube weighing station is disposed upstream of said filling station, which conveys an empty tube weight signal to said control apparatus.

* * * * *